United States Patent
Zheng

(10) Patent No.: US 10,063,883 B2
(45) Date of Patent: Aug. 28, 2018

(54) METHODS AND APPARATUSES FOR CODING AND DECODING DEPTH MAP

(71) Applicant: Huawei Technologies Co., Ltd., Shenzhen (CN)

(72) Inventor: Xiaozhen Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 14/795,677

(22) Filed: Jul. 9, 2015

(65) Prior Publication Data

US 2015/0319459 A1 Nov. 5, 2015

Related U.S. Application Data

(63) Continuation of application No. PCT/CN2014/070460, filed on Jan. 10, 2014.

(30) Foreign Application Priority Data

Jan. 10, 2013 (CN) .......................... 2013 1 0010168

(51) Int. Cl.
*H04N 7/12* (2006.01)
*H04N 11/02* (2006.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS

| 5,832,126 A | 11/1998 | Tanaka |
| 2003/0043918 A1 | 3/2003 | Jiang et al. |

(Continued)

FOREIGN PATENT DOCUMENTS

| CN | 101198066 A | 6/2008 |
| CN | 101646081 A | 2/2010 |

(Continued)

OTHER PUBLICATIONS

Jager, "3D-CE6.h related: Model-based Intra Coding for Depth Maps using a Depth Lookup Table," Joint Collaborative Team on 3D Video Coding Extension Development of ITU-T SG16 WP3 and ISO/IEC JTC 1/SC 29/WG 11, Document JCT2-A0010, pp. 1-8, XP030130009, 1st Meeting: Stockholm, Sweden (Jul. 16-20, 2012).

(Continued)

*Primary Examiner* — Sath V Perungavoor
*Assistant Examiner* — Xiaolan Xu
(74) *Attorney, Agent, or Firm* — Leydig, Voit & Mayer, Ltd.

(57) ABSTRACT

Embodiments of the present invention provide methods and apparatuses for coding and decoding a depth map, where the coding method includes: acquiring an intra-frame prediction mode of a current image block of the depth map; determining whether the intra-frame prediction mode belongs to a preset intra-frame prediction mode set; if yes, using a preset intra-frame prediction method to perform coding processing on the current image block, so as to acquire a residual of the current image block. The preset intra-frame prediction method includes a first intra-frame prediction method; and a difference operation is performed between an average pixel value of the current image block and an average pixel value of prediction data of the current image block to obtain the residual of the current image block.

32 Claims, 5 Drawing Sheets

(51) Int. Cl.
    *H04N 11/04*     (2006.01)
    *H04N 19/593*     (2014.01)
    *H04N 19/182*     (2014.01)
    *H04N 19/105*     (2014.01)
    *H04N 19/159*     (2014.01)
    *H04N 19/597*     (2014.01)
    *H04N 19/11*     (2014.01)
    *H04N 13/00*     (2018.01)

(52) U.S. Cl.
    CPC ......... *H04N 19/159* (2014.11); *H04N 19/182* (2014.11); *H04N 19/597* (2014.11); *H04N 13/0048* (2013.01)

(56) References Cited

U.S. PATENT DOCUMENTS

| | | | |
|---|---|---|---|
| 2009/0103616 A1 | 4/2009 | Ho et al. | |
| 2009/0219994 A1* | 9/2009 | Tu .................. | H04N 19/186 375/240.08 |
| 2010/0239002 A1 | 9/2010 | Park et al. | |
| 2011/0122225 A1* | 5/2011 | Kim .................. | H04N 19/597 348/42 |
| 2011/0310969 A1* | 12/2011 | Park .................. | H04N 19/50 375/240.16 |
| 2013/0251039 A1 | 9/2013 | Drugeon et al. | |
| 2014/0132610 A1 | 5/2014 | Lerios | |
| 2015/0016740 A1 | 1/2015 | Yie et al. | |

FOREIGN PATENT DOCUMENTS

| | | |
|---|---|---|
| CN | 101682781 A | 3/2010 |
| CN | 101873485 A | 10/2010 |
| CN | 102215392 A | 10/2011 |
| CN | 102648631 A | 8/2012 |
| CN | 102685505 A | 9/2012 |
| CN | 102790892 A | 11/2012 |
| CN | 103067715 A | 4/2013 |
| CN | 103067716 A | 4/2013 |
| CN | 103200406 A | 7/2013 |
| KR | 20110139882 A | 12/2011 |

OTHER PUBLICATIONS

Li et al., "A Novel Upsampling Scheme for Depth Map Compression in 3DTV System," 28th Picture Coding Symposium, PCS2010, Nagoya, Japan, XP030081960, pp. 1-4, Institute of Electrical and Electronics Engineers, New York, New York (Dec. 8-10, 2010).

Aflaki et al., "3DV-CE3: Non-linear Depth Map Downsampling for 3DV-ATM Coding (Pre-processing)," Joint Collaborative Team on 3D Video Coding Extension Development of ITU-T SG16 and WP3 and ISO/IEC JTC 1/SC 29/WG11, Document JCT2-A0109, XP030130109, pp. 1-6, 1st Meeting: Stockholm Sweden, (Jul. 16-20, 2012).

Bartnik et al.,"HEVC Extension for Multiview Video Coding and Multiview Video plus Depth Coding," ITU-Telecommunications Standardization Sector, Study Group 16 Questions 6, Video Coding Experts Group (VCEG), Document VCEG-AR13, XP30003856, pp. 1-44, 44nd Meeting, San Jose, CA, USA, (Feb. 3-10, 2012).

"Series H: Audiovisual and Multimedia Systems; Infrastructure of audiovisual services-Coding of moving video; Advanced video coding for generic audiovisual services," Recommendation ITU-T H.264, pp. 1-680, International Telecommunications Union, Geneva, Switzerland (Jan. 2012).

* cited by examiner

METHODS AND APPARATUSES FOR CODING AND DECODING DEPTH MAP

CROSS-REFERENCE TO RELATED APPLICATIONS

This application is a continuation of International Patent Application No. PCT/CN2014/070460, filed on Jan. 10, 2014, which claims priority to Chinese Patent Application No. 201310010168.6, filed on Jan. 10, 2013, both of which are hereby incorporated by reference in their entireties.

TECHNICAL FIELD

Embodiments of the present invention relate to image processing technologies, and in particular, to methods and apparatuses for coding and decoding a depth map.

BACKGROUND

A three-dimensional video image system includes two types of images: a view image and a depth map. The view image includes information, such as color information, of the image itself. The depth map includes depth information, such as contour information, of the view image. To reduce bandwidth occupied by video transmission during transmission of a three-dimensional video image, coding processing needs to be performed on the video image, including coding processing performed on the view image and the depth map, so as to reduce a data size of the three-dimensional video image.

In the prior art, coding processing of the depth map in the three-dimensional video image system uses an intra-frame prediction method. First, a coder splits a to-be-coded image block into one or more sub-image blocks to obtain an intra-frame prediction mode of a current image block, and obtains prediction data of the current image block according to the intra-frame prediction mode, where the image block and the sub-image blocks that are obtained by splitting the image block are generally and collectively referred to as an image block; the prediction data of the image block is used as reference data for coding and decoding the current image block; and the prediction data is pixel data that comes from a coded or decoded neighboring block, or a fixed value preset by a coding-decoding system, or other reference data that comes from a neighboring block and is used for coding and decoding the current image block. The coder successively performs a difference operation between a pixel value of each pixel in the image block and a pixel value of each corresponding pixel in the prediction data (or data of a reference block generated by the prediction data) to obtain a residual matrix, performs quantization, transformation, and entropy coding on the residual matrix, and sends a bitstream obtained by means of entropy coding to a decoder. The decoder reads a bit stream from the obtained bitstream, obtains a corresponding residual by performing dequantization and inverse coding, obtains the prediction data of the current image block, and adds the residual of the current image block and the pixel value of the prediction data (or the pixel value of the reference block generated by the prediction data) to obtain a pixel value of the current image block.

However, efficiency is low when the method in the prior art is used to perform coding and decoding processing on the depth map of the three-dimensional video image.

SUMMARY

Embodiments of the present invention provide methods and apparatus for coding and decoding a depth map, so as to improve processing efficiency of coding and decoding the depth map.

A first aspect of an embodiment of the present invention provides a method for coding a depth map, including:
acquiring an intra-frame prediction mode of a current image block of the depth map;
determining whether the intra-frame prediction mode belongs to a preset intra-frame prediction mode set;
if the intra-frame prediction mode belongs to the preset intra-frame prediction mode set, using a preset intra-frame prediction method to perform coding processing on the current image block, so as to acquire a residual of the current image block; and
coding the residual of the current image block.

With reference to the first aspect, in a first possible implementation manner, the preset intra-frame prediction method includes a first intra-frame prediction method, and the using a preset intra-frame prediction method to perform coding processing on the current image block includes:
obtaining an average pixel value of the current image block;
obtaining an average pixel value of prediction data of the current image block; and
performing a difference operation between the average pixel value of the current image block and the average pixel value of the prediction data of the current image block to obtain the residual of the current image block.

With reference to the first aspect, in a second possible implementation manner, the preset intra-frame prediction method includes a first intra-frame prediction method and a second intra-frame prediction method, and the using a preset intra-frame prediction method to perform coding processing on the current image block includes:
selecting the first intra-frame prediction method or the second intra-frame prediction method to perform coding processing on the current image block, where
the selecting the first intra-frame prediction method to perform coding processing on the current image block includes: obtaining an average pixel value of the current image block; obtaining an average pixel value of prediction data of the current image block; and performing a difference operation between the average pixel value of the current image block and the average pixel value of the prediction data of the current image block to obtain the residual of the current image block; or
the selecting the second intra-frame prediction method to perform coding processing on the current image block includes: obtaining a pixel value of a pixel in the current image block; obtaining a pixel value of a pixel of prediction data of the current image block; and performing a difference operation between the pixel value of the pixel in the current image block and the pixel value of the pixel of the prediction data of the current image block to obtain the residual of the current image block.

With reference to the second possible implementation manner, in a third possible implementation manner, the using a preset intra-frame prediction method to perform coding processing on the current image block further includes:
using the first intra-frame prediction method to perform coding processing on the current image block, so as to obtain a first rate-distortion value of a coding result;

using the second intra-frame prediction method to perform coding processing on the current image block, so as to obtain a second rate-distortion value of the coding result;

if the first rate-distortion value is less than or equal to the second rate-distortion value, selecting the first intra-frame prediction method to perform coding processing on the current image block; and if the first rate-distortion value is greater than the second rate-distortion value, selecting the second intra-frame prediction method to perform coding processing on the current image block.

With reference to the first aspect, in a fourth possible implementation manner, the coding method further includes:

writing identification information into a bitstream, where the identification information is used to indicate the preset intra-frame prediction method that is used by the current image block.

With reference to the first aspect, in a fifth possible implementation manner, the coding method further includes:

if the intra-frame prediction mode belongs to the preset intra-frame prediction mode set, first writing the intra-frame prediction mode into a bitstream, and then writing identification information into the bitstream, where the identification information is used to indicate the preset intra-frame prediction method that is used by the current image block.

With reference to the fourth possible implementation manner or the fifth possible implementation manner, in a sixth possible implementation manner, the writing identification information into a bitstream includes:

determining a context model according to the intra-frame prediction mode of the current image block; and coding the identification information according to the context model.

With reference to the first aspect, in a seventh possible implementation manner, the coding the residual of the current image block includes:

performing mapping on the residual to obtain a mapping value; and coding the mapping value.

With reference to the first aspect or any one possible implementation manner of the first to the seventh possible implementation manners of the first aspect, in an eighth possible implementation manner, the intra-frame prediction mode set includes at least one of the following intra-frame prediction modes:

a direct current DC mode;
a planar mode;
an explicit wedgelet mode; and
an intra-predicted wedgelet partitioning mode.

A second aspect of an embodiment of the present invention provides a method for decoding a depth map, including:

acquiring an intra-frame prediction mode and a residual of a current image block of the depth map;

determining whether the intra-frame prediction mode belongs to a preset intra-frame prediction mode set; and if the intra-frame prediction mode belongs to the preset intra-frame prediction mode set, using a preset intra-frame prediction method to perform decoding on the current image block according to the residual of the current image block.

With reference to the second aspect, in a first possible implementation manner, the preset intra-frame prediction method includes a third intra-frame prediction method, and the using a preset intra-frame prediction method to perform decoding processing on the current image block according to the residual of the current image block includes:

obtaining an average pixel value of prediction data of the current image block; and obtaining a pixel value of a pixel in the current image block according to the average pixel value of the prediction data of the current image block and the residual.

With reference to the first possible implementation manner, in a second possible implementation manner, the obtaining a pixel value of a pixel in the current image block according to the average pixel value of the prediction data of the current image block and the residual includes:

adding the average pixel value of the prediction data of the current image block and the residual to obtain an average pixel value of the current image block; and using the average pixel value of the current image block as the pixel value of the pixel in the current image block.

With reference to the second aspect, in a third possible implementation manner, the preset intra-frame prediction method includes a third intra-frame prediction method and a fourth intra-frame prediction method, and the using a preset intra-frame prediction method to perform decoding processing on the current image block according to the residual of the current image block includes:

selecting the third intra-frame prediction method or the fourth intra-frame prediction method to perform decoding processing on the current image block according to the residual of the current image block, where the selecting the third intra-frame prediction method to perform decoding processing on the current image block according to the residual of the current image block includes: obtaining an average pixel value of prediction data of the current image block; and obtaining a pixel value of a pixel in the current image block according to the average pixel value of the prediction data of the current image block and the residual; or the selecting the fourth intra-frame prediction method to perform decoding processing on the current image block according to the residual of the current image block includes: obtaining a pixel value of a pixel of prediction data of the current image block; and obtaining a pixel value of a pixel in the current image block according to the obtained pixel value of the pixel of the prediction data of the current image block and the residual.

With reference to the third possible implementation manner, in a fourth possible implementation manner, the obtaining a pixel value of a pixel in the current image block according to the average pixel value of the prediction data of the current image block and the residual includes: adding the average pixel value of the prediction data of the current image block and the residual to obtain an average pixel value of the current image block; and using the average pixel value of the current image block as the pixel value of the pixel in the current image block.

With reference to the third possible implementation manner, in a fifth possible implementation manner, the obtaining a pixel value of a pixel in the current image block according to the obtained average pixel value of the prediction data of the current image block and the residual includes:

adding the obtained pixel value of the pixel of the prediction data of the current image block and the residual to obtain the pixel value of the pixel in the current image block.

With reference to the second aspect or the third possible implementation manner of the second aspect, in a sixth possible implementation manner, the decoding method further includes:

obtaining identification information from a bitstream, where the identification information is used to indicate the preset intra-frame prediction method that is used by the current image block, and the selecting the third intra-frame prediction method or the fourth intra-frame prediction method to perform decoding processing on the current image block according to the residual of the current image block includes: selecting the third intra-frame prediction method or the fourth intra-frame prediction method according to the identification information to perform decoding processing on the current image block according to the residual of the current image block.

With reference to the second aspect or the third possible implementation manner of the second aspect, in a seventh possible implementation manner, the decoding method further includes:

if the intra-frame prediction mode belongs to the preset intra-frame prediction mode set, first obtaining the intra-frame prediction mode from a bitstream, and then obtaining identification information from the bitstream, where the identification information is used to indicate the preset intra-frame prediction method that is used by the current image block.

With reference to the sixth possible implementation manner or the seventh possible implementation manner, in an eighth possible implementation manner, the obtaining identification information from a bitstream includes:

determining a context model according to the intra-frame prediction mode of the current image block; and decoding the identification information according to the context model.

With reference to the second aspect, in a ninth possible implementation manner, the performing decoding on the current image block includes:

decoding a bitstream to obtain a mapping value of the residual; and performing mapping on the mapping value to obtain the residual.

With reference to the second aspect or any one possible implementation manner of the first to the ninth possible implementation manners of the second aspect, in a tenth possible implementation manner, the intra-frame prediction mode set includes at least one of the following intra-frame prediction modes:

a direct current DC mode;

a planar mode;

an explicit wedgelet mode; and an intra-predicted wedgelet partitioning mode.

A third aspect of an embodiment of the present invention provides an apparatus for coding a depth map, including:

an acquiring module, configured to acquire an intra-frame prediction mode of a current image block of the depth map; and a coding processing module, configured to determine whether the intra-frame prediction mode belongs to a preset intra-frame prediction mode set; if the intra-frame prediction mode belongs to the preset intra-frame prediction mode set, use a preset intra-frame prediction method to perform coding processing on the current image block, so as to acquire a residual of the current image block; and code the residual of the current image block.

With reference to the third aspect, in a first possible implementation manner, the coding processing module is specifically configured to obtain an average pixel value of the current image block; obtain an average pixel value of prediction data of the current image block; and perform a difference operation between the average pixel value of the current image block and the average pixel value of the prediction data of the current image block to obtain the residual of the current image block.

With reference to the third aspect, in a second possible implementation manner, the preset intra-frame prediction method includes a first intra-frame prediction method and a second intra-frame prediction method, and the coding processing module is specifically configured to select the first intra-frame prediction method or the second intra-frame prediction method to perform coding processing on the current image block, where the selecting the first intra-frame prediction method to perform coding processing on the current image block includes: obtaining an average pixel value of the current image block; obtaining an average pixel value of prediction data of the current image block; and performing a difference operation between the average pixel value of the current image block and the average pixel value of the prediction data of the current image block to obtain the residual of the current image block; or the selecting the second intra-frame prediction method to perform coding processing on the current image block includes: obtaining a pixel value of a pixel in the current image block; obtaining a pixel value of a pixel of prediction data of the current image block; and performing a difference operation between the pixel value of the pixel in the current image block and the pixel value of the pixel of the prediction data of the current image block to obtain the residual of the current image block.

With reference to the second possible implementation manner, in a third possible implementation manner, the coding processing module is further configured to use the first intra-frame prediction method to perform coding processing on the current image block, so as to obtain a first rate-distortion value of a coding result; use the second intra-frame prediction method to perform coding processing on the current image block, so as to obtain a second rate-distortion value of the coding result; if the first rate-distortion value is less than or equal to the second rate-distortion value, select the first intra-frame prediction method to perform coding processing on the current image block; and if the first rate-distortion value is greater than the second rate-distortion value, select the second intra-frame prediction method to perform coding processing on the current image block.

With reference to the third aspect, in a fourth possible implementation manner, the coding processing module is further configured to write identification information into a bitstream, where the identification information is used to indicate the preset intra-frame prediction method that is used by the current image block.

With reference to the third aspect, in a fifth possible implementation manner, the coding processing module is further configured to, if the intra-frame prediction mode belongs to the preset intra-frame prediction mode set, first write the intra-frame prediction mode into a bitstream, and then write identification information into the bitstream, where the identification information is used to indicate the preset intra-frame prediction method that is used by the current image block.

With reference to the fourth possible implementation manner or the fifth possible implementation manner, in a sixth possible implementation manner, the coding processing module is specifically configured to determine a context model according to the intra-frame prediction mode of the current image block; and code the identification information according to the context model.

With reference to the third aspect, in a seventh possible implementation manner, the coding processing module is specifically configured to perform mapping on the residual to obtain a mapping value; and code the mapping value.

With reference to the third aspect or any one possible implementation manner of the first to the seventh possible implementation manners of the third aspect, in an eighth possible implementation manner, the intra-frame prediction mode set includes at least one of the following intra-frame prediction modes:

a direct current DC mode;
a planar mode;
an explicit wedgelet mode; and
an intra-predicted wedgelet partitioning mode.

A fourth aspect of an embodiment of the present invention provides an apparatus for decoding a depth map, including:

an acquiring module, configured to acquire an intra-frame prediction mode and a residual of a current image block of the depth map; and a decoding processing module, configured to determine whether the intra-frame prediction mode belongs to a preset intra-frame prediction mode set; and if the intra-frame prediction mode belongs to the preset intra-frame prediction mode set, use a preset intra-frame prediction method to perform decoding on the current image block according to the residual of the current image block.

With reference to the fourth aspect, in a first possible implementation manner, the preset intra-frame prediction method includes a third intra-frame prediction method, and the decoding processing module is specifically configured to obtain an average pixel value of prediction data of the current image block; and obtain a pixel value of a pixel in the current image block according to the average pixel value of the prediction data of the current image block and the residual.

With reference to the first possible implementation manner, in a second possible implementation manner, the obtaining a pixel value of a pixel in the current image block according to the average pixel value of the prediction data of the current image block and the residual includes:

adding the average pixel value of the prediction data of the current image block and the residual to obtain an average pixel value of the current image block; and using the average pixel value of the current image block as the pixel value of the pixel in the current image block.

With reference to the fourth aspect, in a third possible implementation manner, the preset intra-frame prediction method includes a third intra-frame prediction method and a fourth intra-frame prediction method, and the decoding processing module is specifically configured to select the third intra-frame prediction method or the fourth intra-frame prediction method to perform decoding processing on the current image block according to the residual of the current image block, where the selecting the third intra-frame prediction method to perform decoding processing on the current image block according to the residual of the current image block includes: obtaining an average pixel value of prediction data of the current image block; and obtaining a pixel value of a pixel in the current image block according to the average pixel value of the prediction data of the current image block and the residual; or the selecting the fourth intra-frame prediction method to perform decoding processing on the current image block according to the residual of the current image block includes: obtaining a pixel value of a pixel of prediction data of the current image block; and obtaining a pixel value of a pixel in the current image block according to the obtained pixel value of the pixel of the prediction data of the current image block and the residual.

With reference to the third possible implementation manner, in a fourth possible implementation manner, the decoding processing module is specifically configured to add the average pixel value of the prediction data of the current image block and the residual to obtain an average pixel value of the current image block; and use the average pixel value of the current image block as the pixel value of the pixel in the current image block.

With reference to the third possible implementation manner, in a fifth possible implementation manner, the decoding processing module is specifically configured to add the obtained pixel value of the pixel of the prediction data of the current image block and the residual to obtain the pixel value of the pixel in the current image block.

With reference to the fourth aspect or the third possible implementation manner of the fourth aspect, in a sixth possible implementation manner, the decoding processing module is further configured to obtain identification information from a bitstream, where the identification information is used to indicate the preset intra-frame prediction method that is used by the current image block; and the selecting the third intra-frame prediction method or the fourth intra-frame prediction method to perform decoding processing on the current image block according to the residual of the current image block includes: selecting the third intra-frame prediction method or the fourth intra-frame prediction method according to the identification information to perform decoding processing on the current image block according to the residual of the current image block.

With reference to the fourth aspect or the third possible implementation manner of the fourth aspect, in a seventh possible implementation manner, the decoding processing module is further configured to, if the intra-frame prediction mode belongs to the preset intra-frame prediction mode set, first obtain the intra-frame prediction mode from a bitstream, and then obtain identification information from the bitstream, where the identification information is used to indicate the preset intra-frame prediction method that is used by the current image block.

With reference to the sixth possible implementation manner or the seventh possible implementation manner, in an eighth possible implementation manner, the decoding processing module is specifically configured to determine a context model according to the intra-frame prediction mode of the current image block; and decode the identification information according to the context model.

With reference to the fourth aspect, in a ninth possible implementation manner, the decoding processing module is specifically configured to decode a bitstream to obtain a mapping value of the residual; and perform mapping on the mapping value to obtain the residual.

With reference to the fourth aspect or any one possible implementation manner of the first to the ninth possible implementation manners of the fourth aspect, in a tenth possible implementation manner, the intra-frame prediction mode set includes at least one of the following intra-frame prediction modes:

a direct current DC mode;
a planar mode;
an explicit wedgelet mode; and
an intra-predicted wedgelet partitioning mode.

According to the methods and apparatuses for coding and decoding a depth map provided in the embodiments of the present invention, an intra-frame prediction mode of a current image block of the depth map is acquired; whether the intra-frame prediction mode belongs to a preset intra-frame prediction mode set is determined; if yes, a preset intra-frame prediction method is used to perform coding processing on the current image block, so as to acquire a residual of the current image block. The preset intra-frame prediction method includes a first intra-frame prediction method; and a difference operation is performed between an average pixel value of the current image block and an average pixel value of prediction data of the current image block to obtain the residual of the current image block. Therefore, if the preset intra-frame prediction method is used to perform coding processing on the current image block, coding processing needs to be performed only on one residual. Correspondingly, a decoder needs to perform decoding processing only on one residual. Therefore, processing efficiency of coding and decoding can be improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In a three-dimensional video system, a depth map includes depth information, such as contour information, of a view image. A feature of the depth map is that a texture of most areas is relatively smooth. In general, sharp edge information is included only at an edge of an object. Therefore, when an intra-frame prediction method is used to code the depth map, pixel values of the depth map are relatively uniform and evenly distributed. With reference to the foregoing feature of the depth map, in the embodiments of the present invention, a residual between an average pixel value of an image block and an average pixel value of prediction data of the image block is used to code each image block of the depth map; therefore, only one residual needs to be coded and decoded for each image block, so as to improve processing efficiency of coding and decoding the depth map. The technical solutions of the present invention are described in detail with reference to several specific embodiments as follows.

Figure 1:
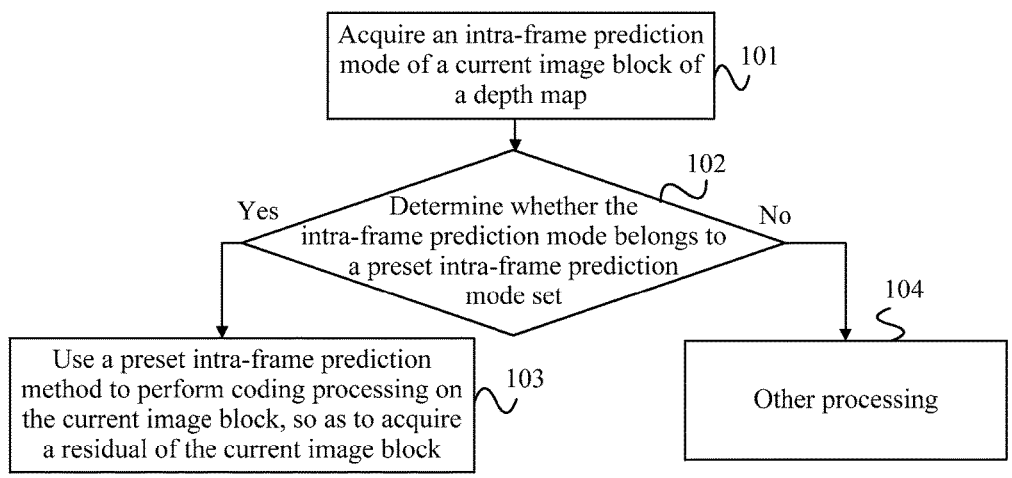
FIG. 1 is a schematic flowchart of Embodiment 1 of a method for coding a depth map according to the present invention.

FIG. 1 is a schematic flowchart of Embodiment 1 of a method for coding a depth map according to the present invention. This embodiment is executed by a coding apparatus. As shown in FIG. 1, the method in this embodiment includes:

S101. Acquire an intra-frame prediction mode of a current image block of the depth map.

Specifically, when coding processing is performed on the depth map, a one-frame image is generally split into one or more regular depth map blocks, and one depth map block is split into one or more image blocks. A shape of an image block may be regular, and may also be irregular. A method for splitting the image block is related to texture information of the depth map blocks. The intra-frame prediction mode of the current image block determines a method for selecting prediction data of the current image block. For example, the intra-frame prediction mode includes a direct current (DC) mode, a planar (Planar) mode, a direction-based mode, or a wedgelet (wedgelet) mode, and the like, where a method for obtaining a pixel value of the prediction data of the current image block in the DC mode is as follows:

First, a value of dcVal is obtained:

$$dcVal = \left( \sum_{x'=0}^{nS-1} p[x'][-1] + \sum_{y'=0}^{nS-1} p[-1][y'] + nS \right) \gg (k+1),$$

where x, y=0 . . . nT−1, and p[x][y] is a pixel value of a pixel whose horizontal coordinate is x and vertical coordinate is y in a neighboring image block of the current image block, and nS indicates a size of the prediction data of the current image block. If the prediction data is a two-dimensional array, it indicates that the size of the prediction data is nS×nS, and k=Log$_2$ (nT).

Then, the pixel value of the prediction data of the current image block is obtained according to the following formulas:

predSamples[0][0]=(p[−1][0]+2×dcVal+p[0][−1]+2)>>2 predSamples[x][0]=(p[x][−1]+3×dcVal+2)>>2,x=1 . . . nT−1 predSamples[0][y]=(p[−1][y]+3×dcVal+2)>>2,y=1 . . . nT−1 predSamples[x][y]=dcVal, where x,y=1 . . . nT−1, and predSamples[x][y] is a pixel value of a pixel whose horizontal coordinate is x and vertical coordinate is y in the prediction data of the current image block.

A method for obtaining a pixel value of the prediction data of the current image block in the planar mode is as follows:

predSamples[x][y]=((nT-1-x)×p[-1][y]+(x+1)×p[nT][-1]+(nT-1-y)×p[x][-1]+(y+1)×p[-1][nT]+nT)>>(Log$_2$(nT)+1), where x,y=0 . . . nT-1, and predSamples[x][y] is a pixel value of a pixel whose horizontal coordinate is x and vertical coordinate is y in the neighboring image block of the current image block, and nT indicates a size of the prediction data of the current image block. If the prediction data is a two-dimensional array, it indicates that the size of the prediction data is nT×nT. Here, p[x][y] indicates a pixel value of a pixel whose horizontal coordinate is x and vertical coordinate is y in the neighboring image block. Log$_2$ (nT) indicates an nT value that is indicated in a logarithm form; for example, a value of Log$_2$ (16) is 4.

A method for obtaining a pixel value of the prediction data of the current image block in the direction-based mode is as follows: the pixel value of the prediction data of the current image block is obtained according to a prediction direction.

A method for obtaining a pixel value of the prediction data of the current image block in the wedgelet mode is as follows:

One image block is split into two areas that have an arbitrary shape, such as two non-rectangle areas. Each area is used as an image block, and each image block uses a constant value as a pixel value of prediction data of the image block.

The wedgelet mode further includes an explicit wedgelet (Wedgelet) mode, an intra-predicted wedgelet (Wedgelet) mode, an inter-component prediction of wedgelet partitioning mode, and an inter-component prediction of contour partitioning mode, where the explicit wedgelet mode identifies a splitting method of the current image block by identifying an endpoint coordinate of a splitting line.

A wedgelet mode based on an intra-frame image block mode obtains a splitting method of the current image block by using an intra-frame mode of a coded image block.

At a coder, an intra-frame prediction mode with a small rate-distortion value is selected as the intra-frame prediction mode of the current image block of the depth map, and the intra-frame prediction mode is coded at the coder.

S102. Determine whether the intra-frame prediction mode belongs to a preset intra-frame prediction mode set. If yes, perform S103; if no, perform S104.

The intra-frame prediction mode set in this embodiment includes at least a DC mode, a Planar mode, an explicit Wedgelet mode, and an intra-predicted Wedgelet partitioning mode. Before the current image block is coded, whether the intra-frame prediction mode belongs to the intra-frame prediction mode set needs to be determined first. Correspondingly, before a decoder that has the same intra-frame prediction mode set as the coder decodes the current image block, whether the intra-frame prediction mode belongs to the intra-frame prediction mode set also needs to be determined first.

S103. Use a preset intra-frame prediction method to perform coding processing on the current image block, so as to acquire a residual of the current image block.

Specifically, the preset intra-frame prediction method may include a first intra-frame prediction method. Correspondingly, the step S103 may be specifically: obtaining an average pixel value of the current image block; obtaining an average pixel value of prediction data of the current image block; and performing a difference operation between the average pixel value of the current image block and the average pixel value of the prediction data of the current image block to obtain the residual of the current image block.

When it is determined that the intra-frame prediction mode belongs to the preset intra-frame prediction mode set, the preset intra-frame prediction method is used to perform coding processing on the current image block, so as to acquire the residual of the current image block. Correspondingly, when it is determined that the intra-frame prediction mode belongs to the preset intra-frame prediction mode set, the decoder uses a preset intra-frame prediction method corresponding to the coder to perform decoding processing on the residual of the current image block.

A difference from the prior art lies in that, in the prior art, coding processing is performed on residuals of all pixels in the current image block. For example, if a size of the current image block is N×N, where N is an integer greater than or equal to 1, in the prior art, N×N residuals need to be coded. However, in this embodiment, coding needs to be performed only on one residual. Correspondingly, the decoder needs to perform decoding only on one residual. Therefore, processing efficiency of coding and decoding can be improved.

Alternatively, the preset intra-frame prediction method may include a first intra-frame prediction method and a second intra-frame prediction method. Correspondingly, the step S103 may be specifically:

selecting the first intra-frame prediction method or the second intra-frame prediction method to perform coding processing on the current image block.

The selecting the first intra-frame prediction method to perform coding processing on the current image block includes: obtaining an average pixel value of the current image block; obtaining an average pixel value of prediction data of the current image block; and performing a difference operation between the average pixel value of the current image block and the average pixel value of the prediction data of the current image block to obtain the residual of the current image block.

The selecting the second intra-frame prediction method to perform coding processing on the current image block includes: obtaining a pixel value of a pixel in the current image block; obtaining a pixel value of a pixel of prediction data of the current image block; and performing a difference operation between the pixel value of the pixel in the current image block and the pixel value of the pixel of the prediction data of the current image block to obtain the residual of the current image block.

S104. Other processing.

If the intra-frame prediction mode of the current image block does not belong to the preset intra-frame prediction mode set, optionally, the method in the prior art may be used to perform coding processing on the current image block, and details are not described herein again.

In this embodiment, before the step S103 or the step S104 is performed, the step S102 is performed because coding processing performance in the step S103 is related to the intra-frame prediction mode, and the preset intra-frame prediction mode set is a set of intra-frame prediction modes that can, as proved by tests, obtain relatively good coding processing performance by using the coding method in the step S103. Therefore, a determining step of the step S102 is added before the step S103 or the step S104 is performed.

In this embodiment, an intra-frame prediction mode of a current image block of a depth map is acquired; whether the intra-frame prediction mode belongs to a preset intra-frame prediction mode set is determined; if yes, a preset intra-frame prediction method is used to perform coding processing on the current image block, so as to acquire a residual of the current image block. The preset intra-frame prediction method includes a first intra-frame prediction method; and a difference operation is performed between an average pixel value of the current image block and an average pixel value of prediction data of the current image block to obtain the residual of the current image block. Therefore, if the preset intra-frame prediction method is used to perform coding processing on the current image block, coding processing needs to be performed only on one residual. Correspondingly, a decoder needs to perform decoding processing only on the residual. Therefore, processing efficiency of coding and decoding can be improved.

Figure 2:
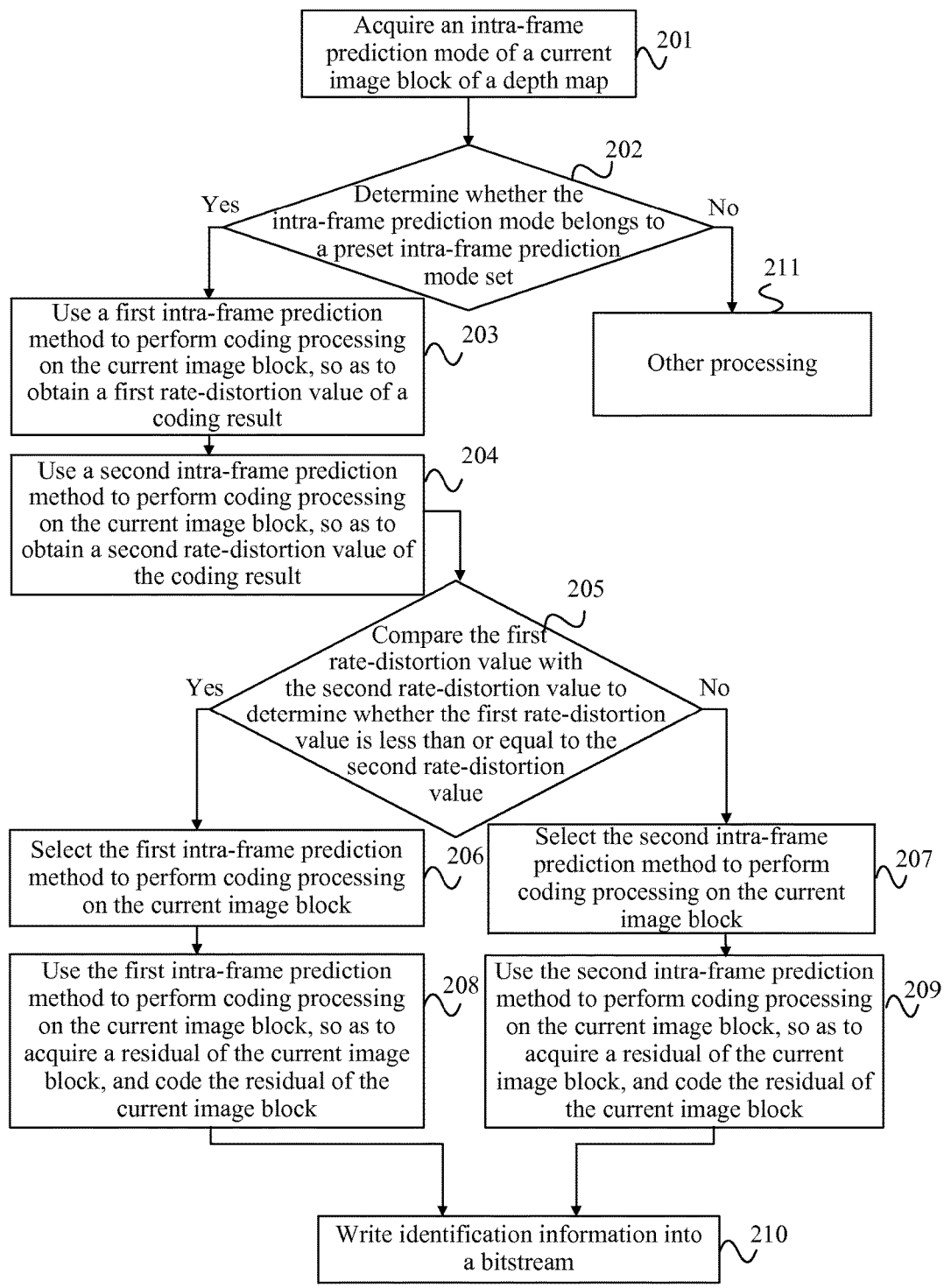
FIG. 2 is a schematic flowchart of Embodiment 2 of a method for coding a depth map according to the present invention.

FIG. 2 is a schematic flowchart of Embodiment 2 of a method for coding a depth map according to the present invention. This embodiment is executed by a coding apparatus. As shown in FIG. 2, the method in this embodiment includes:

S201. Acquire an intra-frame prediction mode of a current image block of the depth map.

S202. Determine whether the intra-frame prediction mode belongs to a preset intra-frame prediction mode set. If yes, perform the steps S203 to S210; if no, perform the step S211.

The steps S201 and S202 are similar to the steps S101 and S102 in the embodiment shown in FIG. 1, and details are not described herein again.

When a preset intra-frame prediction method includes a first intra-frame prediction method and a second intra-frame prediction method, the steps S203 to S210 are performed.

S203. Use a first intra-frame prediction method to perform coding processing on the current image block, so as to obtain a first rate-distortion value of a coding result.

The first intra-frame prediction method includes: obtaining an average pixel value of the current image block; obtaining an average pixel value of prediction data of the current image block; and performing a difference operation between the average pixel value of the current image block and the average pixel value of the prediction data of the current image block to obtain a residual of the current image block.

Specifically, the first step: Obtain the prediction data of the current image block according to the intra-frame prediction mode of the current image block.

For example, when the intra-frame prediction mode is a DC mode or a planar mode, data in the left column or the upper row of the current image block is used as the prediction data.

A reference block generated by the prediction data of the current image block has the same size as the current image block. For example, if a size of the current image block is N×N, a size of the reference block generated by the prediction data is also an N×N two-dimensional array.

Figure 3:
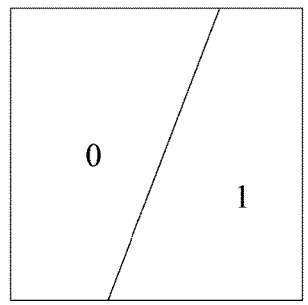
FIG. 3 is a schematic diagram of prediction data of Embodiment 2 of a method for coding a depth map according to the present invention.

FIG. 3 is used as an example. FIG. 3 is a schematic diagram of prediction data of Embodiment 2 of a method for coding a depth map according to the present invention. As shown in FIG. 3, reference blocks generated by the prediction data of an image block of the depth map includes a reference block 0 and a reference block 1; the image block of the depth map is the same as the schematic diagram of the prediction data shown in FIG. 3; and the image block of the depth map includes two sub-image blocks, that is, an image block 0 and an image block 1, where a reference block of the image block 0 is the reference block 0, and a reference block of the image block 1 is the reference block 1.

The second step: Acquire an average pixel value $DC_{pred_i}$ of the prediction data of the current image block, where i indicates a label of an array of the prediction data of the current image block. As shown in FIG. 3, a value of i is 0 or 1, and a method for calculating the average pixel value $DC_{pred_i}$ of the prediction data of the current image block is as follows:

$DC_{pred_i} = \Sigma Pix_i[x,y]/\text{sumOfPixels}$, where $Pix_i[x,y]$ is a pixel value of a pixel whose coordinates are [x,y] in the reference block generated by the prediction data of the current image block, and sumOfPixels is the number of pixels in the reference block of the current image block.

Figure 4:
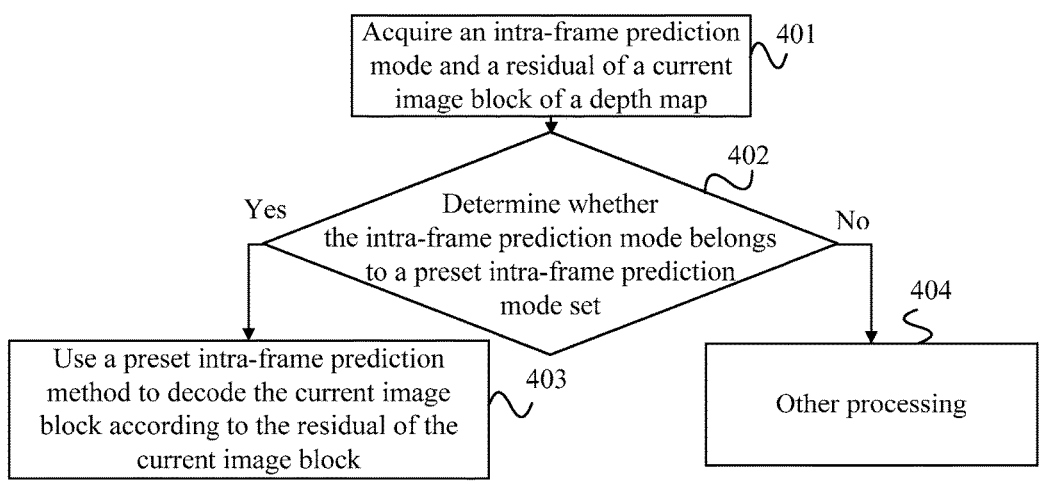
FIG. 4 is a schematic flowchart of Embodiment 1 of a method for decoding a depth map according to the present invention.

Step (3): Acquire an average pixel value $DC_{org_i}$ of the current image block, where i indicates a label of the current image block. As shown in FIG. 4, a value of i is 0 or 1, and a method for calculating the average pixel value $DC_{org_i}$ of the image block is as follows:

$DC_{org_i} = \Sigma Pix_i[x,y]/\text{sumOfPixels}$, where $Pix_i[x,y]$ is a pixel value of a pixel whose coordinates are [x,y] in the current image block, and sumOfPixels is the number of pixels in the current image block.

Step (3) may be performed before step (1) and step (2), and a performing sequence is not limited.

Step (4): Acquire, by means of calculation, a residual $DC_{offset_i}$ between the average pixel value of the prediction data of the current image block and the average pixel value of the current image block. A calculation method is as follows:

$DC_{offset_i} = DC_{pred_i} DC_{org_i}$

Step (5): Perform coding processing on the residual $DC_{offset_i}$ to obtain a coding result.

Step (6): Obtain a first rate-distortion value of the coding result.

A formula for calculating a rate-distortion value R is R=λ*rate+distortion, where λ is a preset constant, rate indicates the number of bits for coding, and distortion indicates an error between an image block after coding and the image block before coding. A smaller value of R indicates higher coding performance of the current image block.

S204. Use a second intra-frame prediction method to perform coding processing on the current image block, so as to obtain a second rate-distortion value of the coding result.

The second intra-frame prediction method includes: obtaining a pixel value of a pixel in the current image block; obtaining a pixel value of a pixel of prediction data of the current image block; and performing a difference operation between the pixel value of the pixel in the current image block and the pixel value of the pixel of the prediction data of the current image block to obtain a residual of the current image block.

There are several implementation manners of performing a difference operation between the pixel value of the pixel in the current image block and the pixel value of the pixel of the prediction data of the current image block to obtain the residual of the current image block:

Optionally, in a first implementation manner, a difference operation is separately performed between a pixel value of each pixel in the current image block and a pixel value of a corresponding pixel in the reference block to obtain the residual of the current image block, where the reference block is generated by the prediction data of the current image block. The foregoing residual is a residual matrix; for example, if a size of the current image block is N×N, the residual of the current image block is an N×N residual matrix.

In a second implementation manner, the same sampling processing is performed on the current image block and on the prediction data of the current image block; a difference operation is separately performed between a pixel value of a sampling point in the current image block and a pixel value of a corresponding sampling point in the reference block to obtain the residual of the current image block, where the reference block is generated by the prediction data of the current image block. The foregoing residual is a residual matrix, and a size of the residual matrix is related to a sampling rule.

In a third implementation manner, a difference operation is performed between a pixel value of each pixel in the current image block and a constant value to obtain the residual of the current image block. The foregoing residual is a residual matrix; for example, if a size of the current image block is N×N, the residual of the current image block is an N×N residual matrix.

In addition, another implementation manner may further be used, which is not limited in the present invention.

The obtained residual of the current image block is coded to obtain the coding result.

A method for calculating a rate-distortion value is used to obtain a second rate-distortion value of the coding result, where the method is the same as that in the step S203.

S205. Compare the first rate-distortion value with the second rate-distortion value to determine whether the first rate-distortion value is less than or equal to the second rate-distortion value. If yes, perform the step S206; if no, perform the step S207.

S206. Select the first intra-frame prediction method to perform coding processing on the current image block.

If the first rate-distortion value is less than or equal to the second rate-distortion value, it indicates that performance of coding the current image block by using the first intra-frame prediction method is high; therefore, it is determined that the first intra-frame prediction method is used. The step S208 is performed.

S207. Select the second intra-frame prediction method to perform coding processing on the current image block.

If the first rate-distortion value is greater than the second rate-distortion value, it indicates that performance of coding the current image block by using the second intra-frame prediction method is high; therefore, it is determined that the second intra-frame prediction method is used. The step S209 is performed.

S208. Use the first intra-frame prediction method to perform coding processing on the current image block, so as to acquire a residual of the current image block, and code the residual of the current image block.

It should be noted that there are the following several implementation manners of coding of the residual of the current image block:

A first implementation manner: Quantization is performed on the residual; the residual is quantized to a smaller value; and fewer bits are used to code the residual. Correspondingly, a scale that is the same as a quantization scale is used to perform dequantization processing at a decoder, and a result after the dequantization processing is used as the residual of the current image block.

A second implementation manner: Only one residual needs to be coded for the current image block; therefore, the residual may also be directly coded without being quantized. Correspondingly, a decoder performs decoding processing on the residual, and uses a result of the decoding processing as the residual of the current image block, so as to avoid compression loss brought about by the quantization.

A third implementation manner: Texture of the depth map is relatively smooth, and pixel values are relatively uniform; therefore, the residual may be mapped to obtain a mapping value; the mapping value is coded; and the number of bits that are required for coding the mapping value is less than the number of bits that are required for directly coding the residual. Therefore, coding efficiency can be further improved. Correspondingly, the decoder performs decoding on the current image block, obtains the mapping value of the residual from a bitstream, and performs mapping, by using a mapping manner the same as that of a coder, on the mapping value to obtain the residual. In the bitstream, the number of bits that are used to code the mapping value of the residual is less than the number of bits that are used to code the residual; therefore, the number of bits that are used for decoding is also relatively small, so that decoding efficiency can be further improved. Optionally, mapping may be performed according to a mapping table or according to a function. The mapping that is performed according to the mapping table is used as an example; pixel values in the depth map are 8, 64, 164, 240, and 245, and corresponding pixel values in the mapping table are 1, 2, 3, 4, and 5. This manner may be used to reduce coding bits and further improve coding efficiency. Correspondingly, the decoder uses the same mapping table to perform decoding processing, so that the residual of the current image block can be obtained without compression loss.

S209. Use the second intra-frame prediction method to perform coding processing on the current image block, so as to acquire a residual of the current image block, and code the residual of the current image block.

Specifically, this step is similar to the step S204, and details are not described herein again.

In the foregoing step S208 or S209, after it is determined that the first prediction method or the second prediction method is used, optionally, the step S210 may further be performed.

S210. Write identification information into a bitstream.

The identification information is used to indicate the preset intra-frame prediction method that is used by the current image block, and the intra-frame prediction method includes the first intra-frame prediction method or the second intra-frame prediction method.

Correspondingly, the decoder may determine, according to the identification information, that an intra-frame prediction method corresponding to the preset intra-frame prediction method is used to perform decoding processing.

Optionally, the step S210 may be: if the intra-frame prediction mode belongs to the preset intra-frame prediction mode set, first writing the intra-frame prediction mode into the bitstream, and then writing the identification information into the bitstream. Such an identification method does not need to additionally identify an intra-frame prediction method and can be highly compatible with the prior art, so that a structure of the bitstream can be simplified, and a bitstream parsing burden of the decoder can be reduced.

When the identification information is written into the bitstream, a context (context) model may be determined according to the intra-frame prediction mode of the current image block, and the identification information is coded according to the context model. For example, when the intra-frame prediction mode is the DC mode or the planar mode, a first context model is used; when the intra-frame prediction mode is the wedgelet mode, a second context model is used. For different context models, different binary bitstreams are used to perform coding processing on the identification information. Correspondingly, the decoder determines the context model according to the intra-frame prediction mode of the current image block, and decodes the identification information according to the context model.

S211. Other processing.

This step is similar to the step S204, and details are not described herein again.

In this embodiment, an intra-frame prediction mode of a current image block of a depth map is acquired; whether the intra-frame prediction mode belongs to a preset intra-frame prediction mode set is determined; if yes, a preset intra-frame prediction method is used to perform coding processing on the current image block, so as to acquire a residual of the current image block. The preset intra-frame prediction method includes a first intra-frame prediction method; and a difference operation is performed between an average pixel value of the current image block and an average pixel value of prediction data of the current image block to obtain the residual of the current image block. Therefore, if the preset intra-frame prediction method is used to perform coding processing on the current image block, coding processing needs to be performed only on one residual. Correspondingly, a decoder needs to perform decoding processing only on one residual. Therefore, processing efficiency of coding and decoding can be improved. In addition, by using identification information to indicate an intra-frame prediction method used by the current image block, the decoder may determine, according to the identification information, that a decoding processing method corresponding to an intra-frame prediction method used by a coder is used to perform decoding processing. The intra-frame prediction mode is first written into a bitstream, and then the identification information is written into the bitstream. Such an identification method does not need to additionally identify an intra-frame prediction method and can be highly compatible with the prior art, so that a structure of the bitstream can be simplified and a bitstream parsing burden of the decoder can be reduced. A mapping value is obtained by performing mapping on the residual, and the mapping value is coded. Because the number of bits that are required for coding the mapping value of the residual is less than the number of bits that are required for coding the residual, and correspondingly, the number of bits that are required by the decoder for decoding is also small, coding and decoding efficiency is further improved. The decoder uses the same mapping manner as the coder to perform mapping on a decoding result, so as not to bring about compression loss.

FIG. 4 is a schematic flowchart of Embodiment 1 of a method for decoding a depth map according to the present invention. This embodiment is executed by a decoding apparatus. The method in this embodiment includes:

S401. Acquire an intra-frame prediction mode and a residual of a current image block of the depth map.

S402. Determine whether the intra-frame prediction mode belongs to a preset intra-frame prediction mode set. If yes, perform the step S403; if no, perform the step S404.

Optionally, the intra-frame prediction mode of the current image block may be preset by a decoder and a coder, or may be obtained by the decoder from a bitstream.

The intra-frame prediction mode includes a DC mode, a Planar mode, a direction-based mode, and a wedgelet mode, and the like. The wedgelet mode further includes an explicit wedgelet (Wedgelet) mode, an intra-predicted wedgelet (Wedgelet) mode, an inter-component prediction of wedgelet partitioning mode, and an inter-component prediction of contour partitioning mode, and the like.

The intra-frame prediction mode set in this embodiment includes at least a DC mode, a planar mode, an explicit wedgelet mode, and an intra-predicted wedgelet partitioning mode. The intra-frame prediction mode set is the same as a preset mode set of the coder.

S403. Use a preset intra-frame prediction method to decode the current image block according to the residual of the current image block.

Specifically, the preset intra-frame prediction method may include a third intra-frame prediction method, and correspondingly, the step S403 may be specifically:

obtaining an average pixel value of prediction data of the current image block; and obtaining a pixel value of a pixel in the current image block according to the average pixel value of the prediction data of the current image block and the residual.

As a feasible implementation manner, the average pixel value of the prediction data of the current image block and the residual are added to obtain an average pixel value of the current image block, and the average pixel value of the current image block is used as the pixel value of the pixel in the current image block.

The preset intra-frame prediction method may include a third intra-frame prediction method and a fourth intra-frame prediction method. Correspondingly, the step S403 may be specifically:

selecting the third intra-frame prediction method or the fourth intra-frame prediction method to perform decoding processing on the current image block according to the residual of the current image block.

The selecting the third intra-frame prediction method to perform decoding processing on the current image block according to the residual of the current image block includes: obtaining an average pixel value of prediction data of the current image block; and obtaining a pixel value of a pixel in the current image block according to the average pixel value of the prediction data of the current image block and the residual.

The selecting the fourth intra-frame prediction method to perform decoding processing on the current image block according to the residual of the current image block includes: obtaining a pixel value of a pixel of prediction data of the current image block; and obtaining a pixel value of a pixel in the current image block according to the obtained pixel value of the pixel of the prediction data of the current image block and the residual.

As an implementation manner, the obtaining a pixel value of a pixel in the current image block according to the average pixel value of the prediction data of the current image block and the residual includes: adding the average pixel value of the prediction data of the current image block and the residual to obtain an average pixel value of the current image block; and using the average pixel value of the current image block as the pixel value of the pixel in the current image block.

S404. Other processing.

If the intra-frame prediction mode does not belong to the preset intra-frame prediction mode set, optionally, the method in the prior art may be used to perform decoding processing on the current image block, and details are not described herein again.

In this embodiment, an intra-frame prediction mode and a residual of a current image block of a depth map is acquired; whether the intra-frame prediction mode belongs to a preset intra-frame prediction mode set is determined; if yes, a preset intra-frame prediction method is used to decode the current image block according to the residual of the current image block. The preset intra-frame prediction method includes a third intra-frame prediction method, where the third intra-frame prediction method includes: obtaining an average pixel value of prediction data of the current image block; and obtaining a pixel value of a pixel in the current image block according to the average pixel value of the prediction data of the current image block and the residual. Decoding of the current image block by a decoder is implemented. Therefore, if the uses the preset intra-frame prediction method to perform coding processing on the current image block, coding processing needs to be performed only on one residual. Correspondingly, if the decoder uses the preset intra-frame prediction method to decode the current image block according to the residual of the current image block, decoding processing needs to be performed only on one residual. Therefore, processing efficiency of coding and decoding can be improved.

Figure 5:
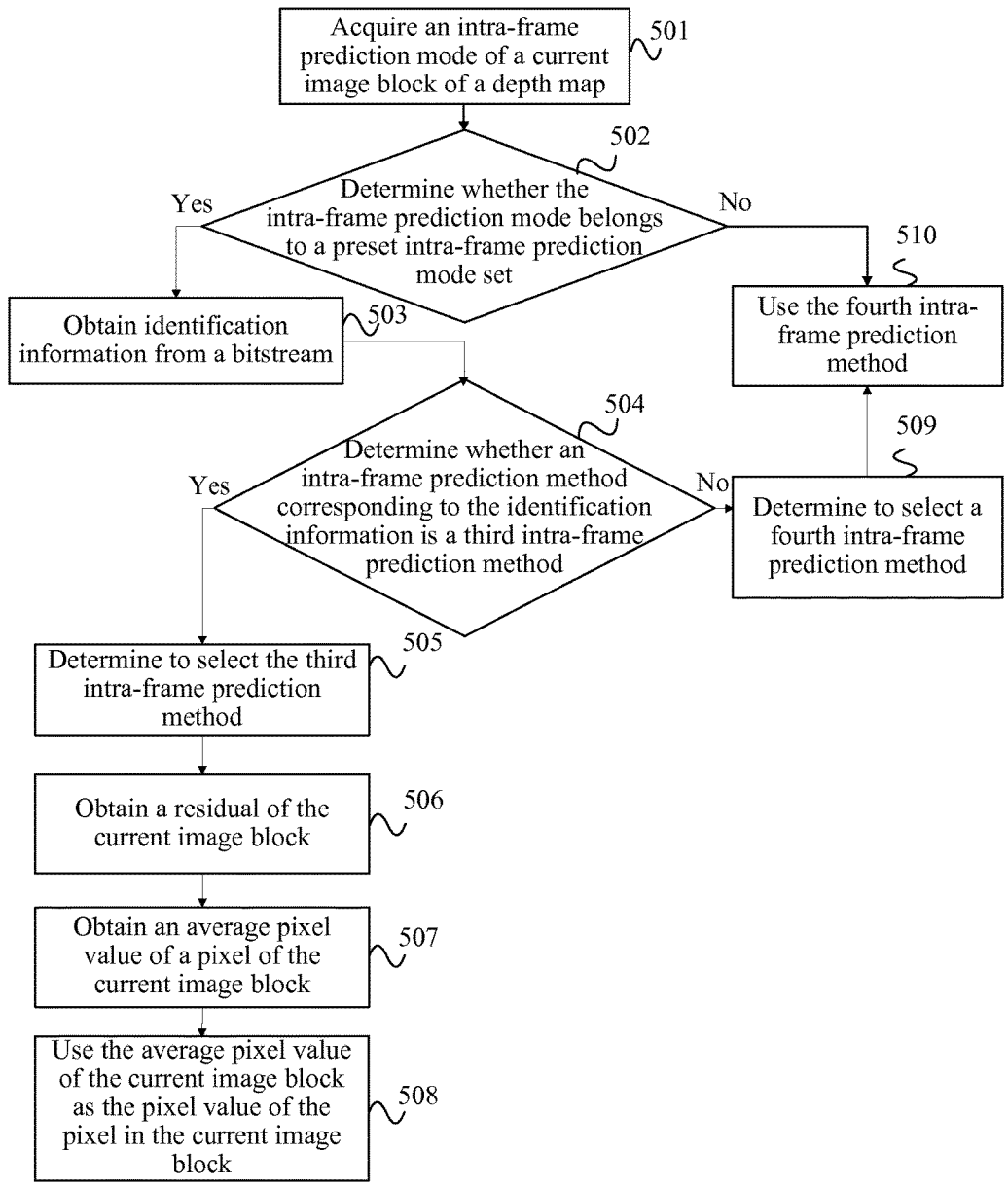
FIG. 5 is a schematic flowchart of Embodiment 2 of a method for decoding a depth map according to the present invention.

FIG. 5 is a schematic flowchart of Embodiment 2 of a method for decoding a depth map according to the present invention. This embodiment is executed by a decoding apparatus. The method in this embodiment includes:

S501. Acquire an intra-frame prediction mode of a current image block of the depth map.

S502. Determine whether the intra-frame prediction mode belongs to a preset intra-frame prediction mode set. If yes, perform the step S503; if no, perform the step S510.

The steps S501 and S502 in this embodiment are similar to the steps S401 and S402 in the embodiment shown in FIG. 4, and details are not described herein again.

S503. Obtain identification information from a bitstream.

Specifically, the identification information is used to indicate a preset intra-frame prediction method that is used by the current image block. Correspondingly, selecting a third intra-frame prediction method or a fourth intra-frame prediction method to perform decoding processing on the current image block according to a residual of the current image block includes: selecting the third intra-frame prediction method or the fourth intra-frame prediction method according to the identification information to perform decoding processing on the current image block according to the residual of the current image block.

Optionally, the method may further be: first obtaining the intra-frame prediction mode from the bitstream, and then obtaining the identification information from the bitstream, so that a structure of the bitstream can be simplified, and a bitstream parsing burden can be reduced.

Optionally, a context model may be determined according to the intra-frame prediction mode of the current image block; and the identification information may be decoded according to the context model. A method for a decoder to determine the context model according to the intra-frame prediction mode of the current image block is the same as that of a coder. For example, when the intra-frame prediction mode is a DC mode or a planar mode, the coder uses a first context model to perform coding processing; when the intra-frame prediction mode is a wedgelet mode, the coder uses a second context model to perform coding processing. For different context models, different coding manners are used to perform coding processing on the identification information. Correspondingly, when the intra-frame prediction mode is the DC mode or the planar mode, the decoder uses the first context model to perform decoding processing; when the intra-frame prediction mode is the wedgelet mode, the decoder uses the second context model to perform decoding processing. For different context models, different decoding manners are used to perform decoding processing on the identification information, so as to obtain an intra-frame prediction method corresponding to the identification information.

S504. Determine whether an intra-frame prediction method corresponding to the identification information is a third intra-frame prediction method. If yes, perform the steps S505 to S508; if no, perform the step S509.

S505. Determine to select the third intra-frame prediction method.

When the coder uses a first intra-frame prediction method to perform coding processing, coding processing is performed on a residual between an average pixel value of the current image block and an average pixel value of prediction data of the current image block. Correspondingly, the decoder uses the third intra-frame prediction method corresponding to the first intra-frame prediction method to perform decoding processing, and the third intra-frame prediction method is obtaining an average pixel value of prediction data of the current image block, and obtaining a pixel value of a pixel in the current image block according to the average pixel value of the prediction data of the current image block and the residual.

S506. Obtain a residual of the current image block.

This step includes the following several implementation manners, and each implementation manner corresponds to an implementation manner of the coder:

A first implementation manner: When the coder performs quantization on the residual before coding the residual of the current image block, the decoder performs decoding processing on a coding result of the current image block, performs dequantization processing on a decoding processing result, where the dequantization corresponds to the quantization of the coder, and uses a decoding processing result after the dequantization processing as the residual of the current image block.

A second implementation manner: When the coder directly codes the residual of the current image block, the decoder performs decoding processing on the bitstream of the current image block, and directly uses a decoding processing result as the residual of the current image block.

A third implementation manner: When the coder performs, before coding the residual of the current image block, mapping on the residual to obtain a mapping value, correspondingly, the decoder performs decoding on the current image block, obtains the mapping value of the residual from the bitstream, and performs mapping, by using a mapping manner the same as that of the coder, on the mapping value to obtain the residual. In the bitstream, the number of bits that are used to code the mapping value of the residual is less than the number of bits that are used to code the residual; therefore, the number of bits that are used for decoding is also relatively small, so that decoding efficiency can be further improved. Optionally, mapping may be performed according to a mapping table or according to a function. The mapping that is performed according to the mapping table is used as an example; pixel values in the depth map are 8, 64, 164, 240, and 245; and corresponding pixel values in the mapping table are 1, 2, 3, 4, and 5. This manner may be used to reduce coding bits and further improve coding efficiency. Correspondingly, the decoder uses the same mapping table to perform decoding processing, so that the residual of the current image block can be obtained without compression loss.

S507. Obtain an average pixel value of a pixel of the current image block.

Specifically, the following steps are included:

Step (1): Obtain an average pixel value of prediction data of the current image block.

The prediction data of the current image block may be obtained according to the intra-frame prediction mode of the current image block. When the intra-frame prediction mode is the DC mode or the planar mode, an image block in the left column or the upper row of the current image block is used as the prediction data of the current image block. In addition, the prediction data may also be data of a neighboring image block.

A reference block generated by the prediction data of the current image block has the same size as the current image block. For example, if a size of the current image block is N×N, a size of an array of the reference block generated by the prediction data is also N×N.

An average pixel value $DC_{pred_i}$ of the prediction data of the current image block is calculated, where i indicates a label of an array of the prediction data of the current image block. As shown in FIG. 3, a value of i is 0 or 1, and a method for calculating the average pixel value $DC_{pred_i}$ of the prediction data of the current image block is as follows:

$$DC_{pred_i} = \Sigma Pix_i[x,y]/\text{sumOfPixels, where}$$

$Pix_i[x,y]$ is a pixel value of a pixel whose coordinates are [x,y] in the reference block generated by the prediction data of the current image block, and sumOfPixels is the number of pixels in the reference block.

Step (2): Add the average pixel value of the prediction data of the current image block and the residual to obtain an average pixel value of the current image block.

The residual is acquired as specifically described in the step S506. $DC_{offset_i}$ indicates the residual of the current image block, and $DC_{org_i}$ indicates the average pixel value of the pixel of the current image block.

$$DC_{org_i} = DC_{offset_i} + DC_{pred_i}$$

S508. Use the average pixel value of the current image block as the pixel value of the pixel in the current image block.

In this step, an average value of pixels in the current image block is used as a pixel value of all pixels in the current image block, to restore the current image block.

S509. Determine to select a fourth intra-frame prediction method.

S510. Use the fourth intra-frame prediction method.

Specifically, the fourth intra-frame prediction method is a method corresponding to a second intra-frame prediction method of the coder.

The fourth intra-frame prediction method includes: obtaining a pixel value of a pixel of prediction data of the current image block; and obtaining a pixel value of a pixel in the current image block according to the obtained pixel value of the pixel of the prediction data of the current image block and the residual, where the pixel value of the pixel in the current image block is obtained by adding the obtained pixel value of the pixel of prediction data of the current image block and the residual.

In this embodiment, an intra-frame prediction mode and a residual of a current image block of a depth map is acquired; whether the intra-frame prediction mode belongs to a preset intra-frame prediction mode set is determined; if yes, a preset intra-frame prediction method is used to decode the current image block according to the residual of the current image block. The preset intra-frame prediction method includes a third intra-frame prediction method, where the third intra-frame prediction method includes: obtaining an average pixel value of prediction data of the current image block; and obtaining a pixel value of a pixel in the current image block according to the average pixel value of the prediction data of the current image block and the residual. Decoding of the current image block by a decoder is implemented. Therefore, if the decoder uses the preset intra-frame prediction method to perform coding processing on the current image block, coding processing only needs to be performed on one residual. Correspondingly, if the decoder uses the preset intra-frame prediction method to decode the current image block according to the residual of the current image block, decoding processing only needs to be performed on one residual. Therefore, processing efficiency of coding and decoding can be improved. Operations corresponding to the coder are performed before the residual of the current image block is obtained. For example, when the decoder performs, before coding the residual of the current image block, mapping on the residual to obtain a mapping value, correspondingly, the decoder performs decoding on the current image block, obtains a mapping value of the residual from the bitstream, and performs mapping, by using a mapping manner the same as that of a coder, on the mapping value to obtain the residual. In the bitstream, the number of bits that are used to code the mapping value of the residual is less than the number of bits that are used to code the residual; therefore, the number of bits that are used for decoding is also relatively small, so that decoding efficiency can be further improved. In addition, the decoder uses the same mapping manner as the coder, so that the residual of the current image block can be obtained without compression loss.

Figure 6:
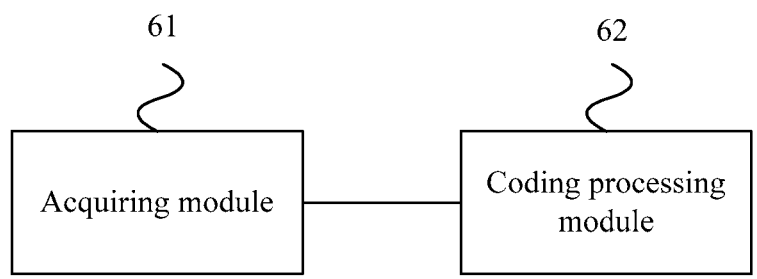
FIG. 6 is a schematic structural diagram of Embodiment 1 of an apparatus for coding a depth map according to the present invention.

FIG. 6 is a schematic structural diagram of Embodiment 1 of an apparatus for coding a depth map according to the present invention. As shown in FIG. 6, the apparatus in this embodiment includes an acquiring module 61 and a coding processing module 62, where the acquiring module 61 is configured to acquire an intra-frame prediction mode of a current image block of the depth map; and the coding processing module 62 is configured to: determine whether the intra-frame prediction mode belongs to a preset intra-frame prediction mode set; if the intra-frame prediction mode belongs to the preset intra-frame prediction mode set, use a preset intra-frame prediction method to perform coding processing on the current image block, so as to acquire a residual of the current image block; and code the residual of the current image block.

The coding apparatus in this embodiment may be used to implement the technical solution in the method embodiment shown in FIG. 1, and implementation principles and technical effects of the apparatus are similar and are not described herein again.

In the foregoing embodiment, the preset intra-frame prediction method includes a first intra-frame prediction method, and the coding processing module 62 is specifically configured to obtain an average pixel value of the current image block; obtain an average pixel value of prediction data of the current image block; and perform a difference operation between the average pixel value of the current image block and the average pixel value of the prediction data of the current image block to obtain the residual of the current image block.

In the foregoing embodiment, the preset intra-frame prediction method includes a first intra-frame prediction method and a second intra-frame prediction method, and the coding processing module 62 is specifically configured to select the first intra-frame prediction method or the second intra-frame prediction method to perform coding processing on the current image block.

The selecting the first intra-frame prediction method to perform coding processing on the current image block includes: obtaining an average pixel value of the current image block; obtaining an average pixel value of prediction data of the current image block; and performing a difference operation between the average pixel value of the current image block and the average pixel value of the prediction data of the current image block to obtain the residual of the current image block.

The selecting the second intra-frame prediction method to perform coding processing on the current image block includes: obtaining a pixel value of a pixel in the current image block; obtaining a pixel value of a pixel of prediction data of the current image block; and performing a difference operation between the pixel value of the pixel in the current image block and the pixel value of the pixel of the prediction data of the current image block to obtain the residual of the current image block.

In the foregoing embodiment, the coding processing module 62 is further configured to use the first intra-frame prediction method to perform coding processing on the current image block, so as to obtain a first rate-distortion value of a coding result; use the second intra-frame prediction method to perform coding processing on the current image block, so as to obtain a second rate-distortion value of the coding result; if the first rate-distortion value is less than or equal to the second rate-distortion value, select the first intra-frame prediction method to perform coding processing on the current image block; and if the first rate-distortion value is greater than the second rate-distortion value, select the second intra-frame prediction method to perform coding processing on the current image block.

In the foregoing embodiment, the coding processing module 62 is further configured to write identification information into a bitstream, where the identification information is used to indicate the preset intra-frame prediction method that is used by the current image block.

In the foregoing embodiment, the coding processing module 62 is further configured to, if the intra-frame prediction mode belongs to the preset intra-frame prediction mode set, first write the intra-frame prediction mode into a bitstream, and then write identification information into the bitstream, where the identification information is used to indicate the preset intra-frame prediction method that is used by the current image block.

In the foregoing embodiment, the coding processing module 62 is specifically configured to determine a context model according to the intra-frame prediction mode of the current image block; and code the identification information according to the context model.

In the foregoing embodiment, the coding processing module 62 is specifically configured to perform mapping on the residual to obtain a mapping value; and code the mapping value.

In the foregoing embodiment, the intra-frame prediction mode set includes at least one of the following intra-frame prediction modes: a direct current DC mode, a planar mode, an explicit wedgelet mode, and an intra-predicted wedgelet partitioning mode.

The coding apparatus in this embodiment may be used to implement the technical solution in the method embodiment shown in FIG. 2, and implementation principles and technical effects of the apparatus are similar and are not described herein again.

Figure 7:
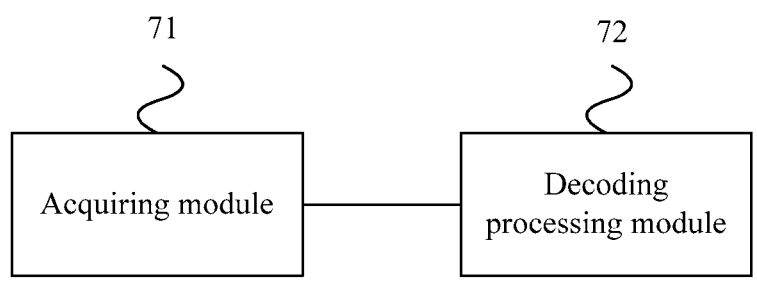
FIG. 7 is a schematic structural diagram of Embodiment 1 of an apparatus for decoding a depth map according to the present invention.

FIG. 7 is a schematic structural diagram of Embodiment 1 of an apparatus for decoding a depth map according to the present invention. As shown in FIG. 7, the decoding apparatus in this embodiment includes an acquiring module 71 and a decoding processing module 72, where the acquiring module 71 is configured to acquire an intra-frame prediction mode and a residual of a current image block of the depth map, and the decoding processing module 72 is configured to determine whether the intra-frame prediction mode belongs to a preset intra-frame prediction mode set; and if the intra-frame prediction mode belongs to the preset intra-frame prediction mode set, use a preset intra-frame prediction method to perform decoding on the current image block according to the residual of the current image block.

The decoding apparatus in this embodiment may be used to implement the technical solution in the method embodiment shown in FIG. 4, and implementation principles and technical effects of the apparatus are similar and are not described herein again.

In the foregoing embodiment, the preset intra-frame prediction method includes a third intra-frame prediction method, and the decoding processing module 72 is specifically configured to obtain an average pixel value of prediction data of the current image block; and obtain a pixel value of a pixel in the current image block according to the average pixel value of the prediction data of the current image block and the residual.

In the foregoing embodiment, the decoding processing module 72 is specifically configured to add the average pixel value of the prediction data of the current image block and the residual to obtain an average pixel value of the current image block; and use the average pixel value of the current image block as the pixel value of the pixel in the current image block.

In the foregoing embodiment, the preset intra-frame prediction method includes a third intra-frame prediction method and a fourth intra-frame prediction method, and the decoding processing module 72 is specifically configured to select the third intra-frame prediction method or the fourth intra-frame prediction method to perform decoding processing on the current image block according to the residual of the current image block.

The selecting the third intra-frame prediction method to perform decoding processing on the current image block according to the residual of the current image block includes: obtaining an average pixel value of prediction data of the current image block; and obtaining a pixel value of a pixel in the current image block according to the average pixel value of the prediction data of the current image block and the residual.

The selecting the fourth intra-frame prediction method to perform decoding processing on the current image block according to the residual of the current image block includes: obtaining a pixel value of a pixel of prediction data of the current image block; and obtaining a pixel value of a pixel in the current image block according to the obtained pixel value of the pixel of the prediction data of the current image block and the residual.

In the foregoing embodiment, the decoding processing module 72 is specifically configured to add the average pixel value of the prediction data of the current image block and the residual to obtain an average pixel value of the current image block; and use the average pixel value of the current image block as the pixel value of the pixel in the current image block.

In the foregoing embodiment the decoding processing module 72 is specifically configured to add the obtained pixel value of the pixel of the prediction data of the current image block and the residual to obtain the pixel value of the pixel in the current image block.

In the foregoing embodiment, the decoding processing module 72 is further configured to obtain identification information from a bitstream, where the identification information is used to indicate the preset intra-frame prediction method that is used by the current image block.

The selecting the third intra-frame prediction method or the fourth intra-frame prediction method to perform decoding processing on the current image block according to the residual of the current image block includes: selecting the third intra-frame prediction method or the fourth intra-frame prediction method according to the identification information to perform decoding processing on the current image block according to the residual of the current image block.

In the foregoing embodiment, the decoding processing module 72 is further configured to, if the intra-frame prediction mode belongs to the preset intra-frame prediction mode set, first obtain the intra-frame prediction mode from a bitstream, and then obtain identification information from the bitstream, where the identification information is used to indicate the preset intra-frame prediction method that is used by the current image block.

In the foregoing embodiment, the decoding processing module 72 is specifically configured to determine a context model according to the intra-frame prediction mode of the current image block; and decode the identification information according to the context model.

In the foregoing embodiment, the decoding processing module 72 is specifically configured to decode a bitstream to obtain a mapping value of the residual; and perform mapping on the mapping value to obtain the residual.

In the foregoing embodiment, the intra-frame prediction mode set includes at least one of the following intra-frame prediction modes: a direct current DC mode, a planar mode, an explicit wedgelet mode, and an intra-predicted wedgelet partitioning mode.

The decoding apparatus in this embodiment may be used to implement the technical solution in the method embodiment shown in FIG. 5, and implementation principles and technical effects of the apparatus are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A non-transitory, computer-readable storage medium, including instruction that, when executed by relevant hardware, causes the hardware to code a depth map by performing a method comprising:
   acquiring an intra-frame prediction mode of a current image block of the depth map;
   determining whether the intra-frame prediction mode belongs to a preset intra-frame prediction mode set;
   when the intra-frame prediction mode belongs to the preset intra-frame prediction mode set, using a preset intra-frame prediction method to perform coding processing on the current image block so as to acquire a residual of the current image block, wherein the preset intra-frame prediction method is a first method comprising:
   a) obtaining an average pixel value of the current image block;
   b) obtaining an average pixel value of prediction data of the current image block;
   c) performing a difference operation between the average pixel value of the current image block and the average pixel value of the prediction data of the current image block to obtain the residual of the current image block; and
   d) coding the residual of the current image block,
   or a second method comprising:
   a) obtaining a pixel value of a pixel in the current image block;
   b) obtaining a pixel value of a pixel of prediction data of the current image block;
   c) performing a difference operation between the pixel value of the pixel in the current image block and the pixel value of the pixel of the prediction data of the current image block to obtain the residual of the current image block, and
   d) coding the residual of the current image block.

2. The method according to claim 1, wherein the using the preset intra-frame prediction method to perform coding processing on the current image block further comprises:
   using the first method to perform coding processing on the current image block, so as to obtain a first rate-distortion value of a coding result;
   using the second method to perform coding processing on the current image block, so as to obtain a second rate-distortion value of the coding result;
   when the first rate-distortion value is less than or equal to the second rate-distortion value, selecting the first method to perform coding processing on the current image block; and
   when the first rate-distortion value is greater than the second rate-distortion value, selecting the second method to perform coding processing on the current image block.

3. The method according to claim 1, wherein the method further comprises writing identification information into a bitstream, wherein the identification information indicates the preset intra-frame prediction method for coding the current image block.

4. The method according to claim 1, wherein the method further comprises:
   when the intra-frame prediction mode belongs to the preset intra-frame prediction mode set, first writing the intra-frame prediction mode into a bitstream, and then writing identification information into the bitstream, wherein the identification information indicates the preset intra-frame prediction method for coding the current image block.

5. The method according to claim 3, wherein writing identification information into a bitstream comprises:
   determining a context model according to the intra-frame prediction mode of the current image block; and
   coding the identification information according to the context model.

6. The method according to claim 1, wherein coding the residual of the current image block comprises:
   performing mapping on the residual to obtain a mapping value; and
   coding the mapping value.

7. The method according to claim 1, wherein the intra-frame prediction mode set comprises at least one of the following intra-frame prediction modes:
- a direct current (DC) mode;
- a planar mode;
- an explicit wedgelet mode; and
- an intra-predicted wedgelet partitioning mode.

8. A non-transitory, computer-readable storage medium, including instruction that, when executed by relevant hardware, causes the hardware to code a depth map by performing a method comprising:
- acquiring an intra-frame prediction mode and a residual of a current image block of the depth map;
- determining whether the intra-frame prediction mode belongs to a preset intra-frame prediction mode set comprising at least one from the group of (a) a direct current (DC) mode, (b) a planar mode, (c) an explicit wedgelet mode and (d) an intra-predicted Wedgelet partitioning mode; and
- when the intra-frame prediction mode belongs to the preset intra-frame prediction mode set, using a preset intra-frame prediction method to perform decoding on the current image block according to the residual of the current image block.

9. The decoding method according to claim 8, wherein the preset intra-frame prediction method comprises a third intra-frame prediction method, and
using the preset intra-frame prediction method to perform decoding processing on the current image block according to the residual of the current image block comprises:
- a) obtaining an average pixel value of prediction data of the current image block; and
- b) obtaining a pixel value of a pixel in the current image block according to the average pixel value of the prediction data of the current image block and the residual.

10. The decoding method according to claim 9, wherein obtaining the pixel value of the pixel in the current image block according to the average pixel value of the prediction data of the current image block and the residual comprises:
- a) adding the average pixel value of the prediction data of the current image block and the residual to obtain an average pixel value of the current image block; and
- b) using the average pixel value of the current image block as the pixel value of the pixel in the current image block.

11. The decoding method according to claim 8, wherein the preset intra-frame prediction method comprises third and fourth intra-frame prediction methods, and
using the preset intra-frame prediction method to perform decoding processing on the current image block according to the residual of the current image block comprises:
selecting the third or fourth intra-frame prediction method to perform decoding processing on the current image block according to the residual of the current image block, wherein:
the third intra-frame prediction method comprises:
- a) obtaining an average pixel value of prediction data of the current image block; and
- b) obtaining a pixel value of a pixel in the current image block according to the average pixel value of the prediction data of the current image block and the residual; and the fourth intra-frame prediction method comprises:
- a) obtaining a pixel value of a pixel of prediction data of the current image block; and
- b) obtaining a pixel value of a pixel in the current image block according to the obtained pixel value of the pixel of the prediction data of the current image block and the residual.

12. The decoding method according to claim 11, wherein obtaining the pixel value of the pixel in the current image block according to the average pixel value of the prediction data of the current image block and the residual comprises:
- a) adding the average pixel value of the prediction data of the current image block and the residual to obtain an average pixel value of the current image block; and
- b) using the average pixel value of the current image block as the pixel value of the pixel in the current image block.

13. The decoding method according to claim 11, wherein obtaining the pixel value of the pixel in the current image block according to the obtained average pixel value of the prediction data of the current image block and the residual comprises:
adding the obtained pixel value of the pixel of the prediction data of the current image block and the residual to obtain the pixel value of the pixel in the current image block.

14. The decoding method according to claim 11, wherein the decoding method further comprises:
obtaining identification information from a bitstream, wherein the identification information indicates the preset intra-frame prediction method for decoding the current image block, and
selecting the third or fourth intra-frame prediction method to perform decoding processing on the current image block according to the residual of the current image block further comprises:
selecting the third or fourth intra-frame prediction method according to the identification information to perform decoding processing on the current image block according to the residual of the current image block.

15. The decoding method according to claim 8, wherein the decoding method further comprises:
when the intra-frame prediction mode belongs to the preset intra-frame prediction mode set,
obtaining the intra-frame prediction mode from a bitstream, and
obtaining identification information from the bitstream, wherein the identification information indicates the preset intra-frame prediction method for decoding the current image block.

16. The decoding method according to claim 14, wherein obtaining the identification information from a bitstream comprises:
- determining a context model according to the intra-frame prediction mode of the current image block; and
- decoding the identification information according to the context model.

17. The decoding method according to claim 8, wherein performing decoding on the current image block comprises:
- decoding a bitstream to obtain a mapping value of the residual; and
- performing mapping on the mapping value to obtain the residual.

18. An apparatus for coding a depth map, the apparatus comprising a processor and a non-transitory, processor-readable storage medium including processor-executable instructions that, when executed by the processor, configures the processor to perform operations comprising:
acquiring an intra-frame prediction mode of a current image block of the depth map;
determining whether the intra-frame prediction mode belongs to a preset intra-frame prediction mode set; and
when the intra-frame prediction mode belongs to the preset intra-frame prediction mode set, use a preset intra-frame prediction method to perform coding processing on the current image block, so as to acquire a residual of the current image block, wherein the preset intra-frame prediction method is a first method comprising:
a) obtaining an average pixel value of the current image block,
b) obtaining an average pixel value of prediction data of the current image block, and
c) performing a difference operation between the average pixel value of the current image block and the average pixel value of the prediction data of the current image block to obtain the residual of the current image block,
or a second method comprising:
a) obtaining a pixel value of a pixel in the current image block,
b) obtaining a pixel value of a pixel of prediction data of the current image block, and
c) performing a difference operation between the pixel value of the pixel in the current image block and the pixel value of the pixel of the prediction data of the current image block to obtain the residual of the current image block,
coding the residual of the current image block.

19. The coding apparatus according to claim 18, wherein the processor is further configured to:
use the first intra-frame prediction method to perform coding processing on the current image block, so as to obtain a first rate-distortion value of a coding result;
use the second intra-frame prediction method to perform coding processing on the current image block, so as to obtain a second rate-distortion value of the coding result;
when the first rate-distortion value is less than or equal to the second rate-distortion value, select the first intra-frame prediction method to perform coding processing on the current image block; and
when the first rate-distortion value is greater than the second rate-distortion value, select the second intra-frame prediction method to perform coding processing on the current image block.

20. The coding apparatus according to claim 18, wherein the processor is further configured to write identification information into a bitstream, wherein the identification information is used to indicate the preset intra-frame prediction method that is used by the current image block.

21. The coding apparatus according to claim 18, wherein the processor is further configured to:
when the intra-frame prediction mode belongs to the preset intra-frame prediction mode set,
write the intra-frame prediction mode into a bitstream, and
write identification information into the bitstream, wherein the identification information indicates the preset intra-frame prediction method for coding the current image block.

22. The coding apparatus according to claim 20, wherein the processor is further configured to determine a context model according to the intra-frame prediction mode of the current image block and code the identification information according to the context model.

23. The coding apparatus according to claim 18, wherein the processor is further configured to perform mapping on the residual to obtain a mapping value and code the mapping value.

24. The coding apparatus according to claim 18, wherein the intra-frame prediction mode set comprises at least one of the following intra-frame prediction modes:
a direct current (DC) mode;
a planar mode;
an explicit wedgelet mode; and
an intra-predicted Wedgelet partitioning mode.

25. An apparatus for decoding a depth map, the apparatus comprising a processor and a non-transitory, processor-readable storage medium including processor-executable instructions that, when executed by the processor, configures the processor to perform operations comprising:
acquiring an intra-frame prediction mode and a residual of a current image block of the depth map; and
determining whether the intra-frame prediction mode belongs to a preset intra-frame prediction mode set; and
when the intra-frame prediction mode belongs to the preset intra-frame prediction mode set, using a preset intra-frame prediction method to decode the current image block according to the residual of the current image block, wherein the preset intra-frame prediction method is a first method comprising:
a) obtaining an average pixel value of prediction data of the current image block, and
b) obtaining a pixel value of a pixel in the current image block according to the average pixel value of the prediction data of the current image block and the residual;
or a second method comprising:
a) obtaining a pixel value of a pixel of prediction data of the current image block, and
b) obtaining a pixel value of a pixel in the current image block according to the obtained pixel value of the pixel of the prediction data of the current image block and the residual.

26. The decoding apparatus according to claim 25, wherein the obtaining a pixel value of a pixel in the current image block according to the average pixel value of the prediction data of the current image block and the residual comprises:
adding the average pixel value of the prediction data of the current image block and the residual to obtain an average pixel value of the current image block; and
using the average pixel value of the current image block as the pixel value of the pixel in the current image block.

27. The decoding apparatus according to claim 25, wherein the obtaining a pixel value of a pixel in the current image block according to the obtained average pixel value of the prediction data of the current image block and the residual comprises:
adding the obtained pixel value of the pixel of the prediction data of the current image block and the residual to obtain the pixel value of the pixel in the current image block.

28. The decoding apparatus according to claim 25, wherein the processor is further configured to obtain identification information from a bitstream, wherein the identification information indicates the preset intra-frame prediction method that is used by the current image block; and selecting one of the first or second methods to decode the current image block according to the residual of the current image block.

29. The decoding apparatus according to claim 25, wherein the processor is further configured to:
obtain the intra-frame prediction mode from a bitstream, and
obtain identification information from the bitstream, wherein the identification information indicates the preset intra-frame prediction method that is used for decoding the current image block.

30. The decoding apparatus according to claim 28, wherein the obtaining the identification information from a bitstream comprises determining a context model according to the intra-frame prediction mode of the current image block; and
decoding the identification information according to the context model.

31. The decoding apparatus according to claim 25, wherein the processor is further configured to decode the current image block by decoding a bitstream to obtain a mapping value of the residual; and mapping on the mapping value to obtain the residual.

32. The decoding apparatus according to claim 25, wherein the intra-frame prediction mode set comprises at least one of the following intra-frame prediction modes:
a direct current (DC) mode;
a planar mode;
an explicit wedgelet mode; and
an intra-predicted Wedgelet partitioning mode.

* * * * *